United States Patent [19]
Glucksman et al.

[11] Patent Number: 6,064,042
[45] Date of Patent: May 16, 2000

[54] REVERSIBLE SELF-CONTAINED COOKING APPLIANCE

[75] Inventors: Dov Z. Glucksman, Wenham, Mass.; David H. R. St. George, Newtown, Conn.; Karl H. Weidemann, Hull, Mass.

[73] Assignee: Appliance Development Corporation, Danvers, Mass.

[21] Appl. No.: 09/253,672

[22] Filed: Feb. 19, 1999

[51] Int. Cl.[7] .............. H05B 3/68; H05B 3/00; A47J 37/10
[52] U.S. Cl. .............. 219/452.13; 99/378; 99/425
[58] Field of Search .............. 219/443.1, 450.1, 219/452.13, 455.11, 455.12; 99/340, 375, 376, 378, 380, 400, 425, 446

[56] References Cited

U.S. PATENT DOCUMENTS

| | | | |
|---|---|---|---|
| 1,201,138 | 10/1916 | Bingham . | |
| 1,733,450 | 10/1929 | Detwiller . | |
| 2,198,647 | 4/1940 | Wolcott | 53/3 |
| 2,840,684 | 6/1958 | Watkins, Jr. | 219/44 |
| 3,348,470 | 10/1967 | Swanson | 99/331 |
| 3,632,982 | 1/1972 | Linger | 219/447 |
| 3,678,844 | 7/1972 | Marshall | 99/340 |
| 3,947,657 | 3/1976 | Ershler | 219/454 |
| 4,011,431 | 3/1977 | Levin | 219/524 |
| 5,176,067 | 1/1993 | Higgins | 219/450.1 |
| 5,355,779 | 10/1994 | O'Brien et al. | 99/446 |
| 5,464,955 | 11/1995 | Cole | 200/317 |
| 5,488,897 | 2/1996 | Snyder | 99/445 |
| 5,524,528 | 6/1996 | Yeh | 219/450.1 |
| 5,575,941 | 11/1996 | Johnson | 219/544 |
| 5,884,555 | 3/1999 | Chang | 99/425 |

*Primary Examiner*—Teresa Walberg
*Assistant Examiner*—Sam Paik
*Attorney, Agent, or Firm*—George A. Herbster; Pearson & Pearson

[57] ABSTRACT

A reversible, self-contained cooking appliance. A heating plate is suspended between first and second insulating end stands. The heating plate has first and second cooking surfaces on opposite sides thereof and includes an integral heater. The end stands support the heating plate for cooking in a first orientation. One of the end stands is adapted to store the cooking appliance in a vertical position for storage. During use the end stands position a reflector between the heating plate and a support surface so that the reflector minimizes any heat transfer to the supporting surface. In a preferred form a drain is disposed along one end of the heating plate to allow grease and other cooking materials to drain into the reflector.

68 Claims, 8 Drawing Sheets

REVERSIBLE SELF-CONTAINED COOKING APPLIANCE

BACKGROUND OF THE INVENTION

1. Field of the Invention

This invention generally relates to cooking appliances and more particularly to cooking appliances that provide different cooking surfaces.

2. Description of Related Art

Cooking appliances generally have different surfaces for accommodating different cooking styles. For example, flat cooking surfaces are used for griddling; ribbed cooking surfaces, for grilling. In home applications constraints on storage areas, utilization factors and costs often preclude a family from purchasing an individual cooking appliance to provide each type of cooking surface; such as one pan or cooking appliance with a flat surface for griddling and another pan or cooking appliance with a ribbed surface for grilling.

A number of efforts have been made to develop pans and cooking appliances that incorporate two cooking surfaces. Initially multiple cooking surface were incorporated in cooking pans that were adapted to be placed on an independent cooking surface, such as a stove. U.S. Pat. No. 1,733,450 (1929) to Detwiler for a cooking utensil and U.S. Pat. No. 2,198,646 (1940) to Walcott for a cooking utensil described two examples. Detwiler discloses a reversible cooking utensil in which one side is adapted to be used as a griddle and the other side is grooved to for use as a broiler or grill. Walcott discloses a similar structure that has a parallel ribbed surface for broiling and a flat surface for frying or griddling.

More recently efforts have been made to provide multiple cooking surfaces in self-contained cooking appliances. For example, U.S. Pat. No. 3,348,470 (1967) to Swanson discloses a waffle maker with an upper and lower housing. Each of the upper and lower housings contains a heating element that is closely juxtaposed a removable and reversible cooking plate or grid that has a griddle surface on one side and a waffle surface on the other side.

U.S. Pat. No. 3,632,982 (1972) to Linger discloses a surface cooktop that has first and second positions. In a first position a cooking element is disposed in a recess of a stove counter or the like so that it is flush with the surface. For cooking the unit is removed and reversed to expose a flat cooking surface elevated above the counter. In reversing the structure electrical contacts are enabled to connect into electrical power.

U.S. Pat. No. 4,011,431 (1976) to Levin discloses an electric cooker with an electric heating element and base interposed by an invertible grill. The opposite faces of this grill present a circular dam for hamburgers or the like and a rectangular dam for sandwiches. A peripheral heating element in the cover provides heating.

U.S. Pat. No. 2,840,684 (1958) to Watkins discloses a cooking appliance in the form of a combination frying pan and griddle. This cooking appliance includes a heating element embedded in a peripheral wall of heat conducting material. A relatively thin heating plate spans the peripheral wall and includes a ribbed cooking surface on one side and a flat cooking surface on the other side. It is integrally formed with the peripheral side wall. In a first position the appliance provides a griddle surface; in a second, inverted position, a grilling surface. Even heating in this structure is attributed to using the combination of the thin heating element and the more massive peripheral wall with its embedded heater.

Placing a heater in the peripheral wall of heat conducting material assumes that the external surface of the heating pan becomes very hot. In Watkins legs space the cooking surface above a countertop to prevent heat radiating from the cooking surface from damaging the countertop. After use the cooking appliance apparently must be stored in some horizontal orientation as for cooking. The orientation is not conducive to placing other items on top of the cooking appliance. Consequently Watkins' cooking appliance will consume a significant storage volume. In addition the cooking appliance incorporates an integral thermostatic control. In a dishwasher environment, it is likely that water will penetrate any covers and corrode or otherwise destroy the electrical connections leading to premature failure. Thus, the cooking appliance is not dishwasher safe and must be washed by hand.

SUMMARY

Therefore it is an object of this invention to provide a cooking appliance that is reversible to provide two different cooking surfaces.

Another object of this invention is to provide a cooking appliance that is reversible to provide a flat griddle surface in a first orientation and a ribbed grilling surface in a second orientation.

Still another object of this invention is to provide a cooking appliance that is reversible for different uses in horizontal orientations and that is adapted for storage in a vertical orientation.

Yet another object of this invention is to provide a cooking appliance that requires minimal spacing between the heating element of the utensil and a supporting surface during use.

Yet still another object of this invention is to provide a reversible cooking appliance that minimizes the accumulation of grease on either of the cooking surfaces during use.

Yet still another object of this invention is to provide a reversible cooking appliance that is dishwasher safe.

In accordance with one aspect of this invention, a reversible self-contained cooking appliance comprises a heating plate with first and second cooking surfaces on opposite sides thereof and with an integral heater therein. First and second end stands connect to opposite ends of the heating plate for suspending the heating plate therebetween parallel to and spaced from a supporting surface with one of the first and second cooking surfaces being an upper, working surface. A reflector mounts intermediate the heating plate and support surface and has an extent that corresponds to the extent of each of the first and second cooking surfaces.

In accordance with another aspect of this invention, an electric self-contained cooking appliance comprises a heating plate with at least one cooking surface and an integral electric heater element. A reflector mounts intermediate the heating plate and a support surface and has an extent that corresponds to the extent of the cooking surfaces. First and second end stands suspend the heating plate therebetween parallel to and spaced from the supporting surface.

In accordance with yet another aspect of this invention, a reversible self-contained cooking appliance comprises a heating plate with first and second cooking surfaces on opposite sides thereof and with an integral heater therein. First and second end stands suspend the heating plate therebetween parallel to and spaced from a supporting surface with one of the first and second cooking surfaces being an upper, working surface. The heating plate has a drain therethrough. A receptacle mounts intermediate the heating plate and support surface and has an extent that corresponds to the extent of each of the first and second cooking surfaces. A portion of the receptacle aligns with the drain to accumulate material passing through the drain.

In accordance with still another aspect of this invention, a reversible self-contained cooking appliance comprises a heating plate with first and second cooking surfaces on opposite sides thereof and an integral electrical heater element. First and second end stands suspend the heating plate therebetween parallel to and spaced from a supporting surface with one of the first and second cooking surfaces being an upper, working surface. A reflector mounted intermediate the heating plate and support surface has an extent that corresponds to the extent of each of said first and second cooking surfaces.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
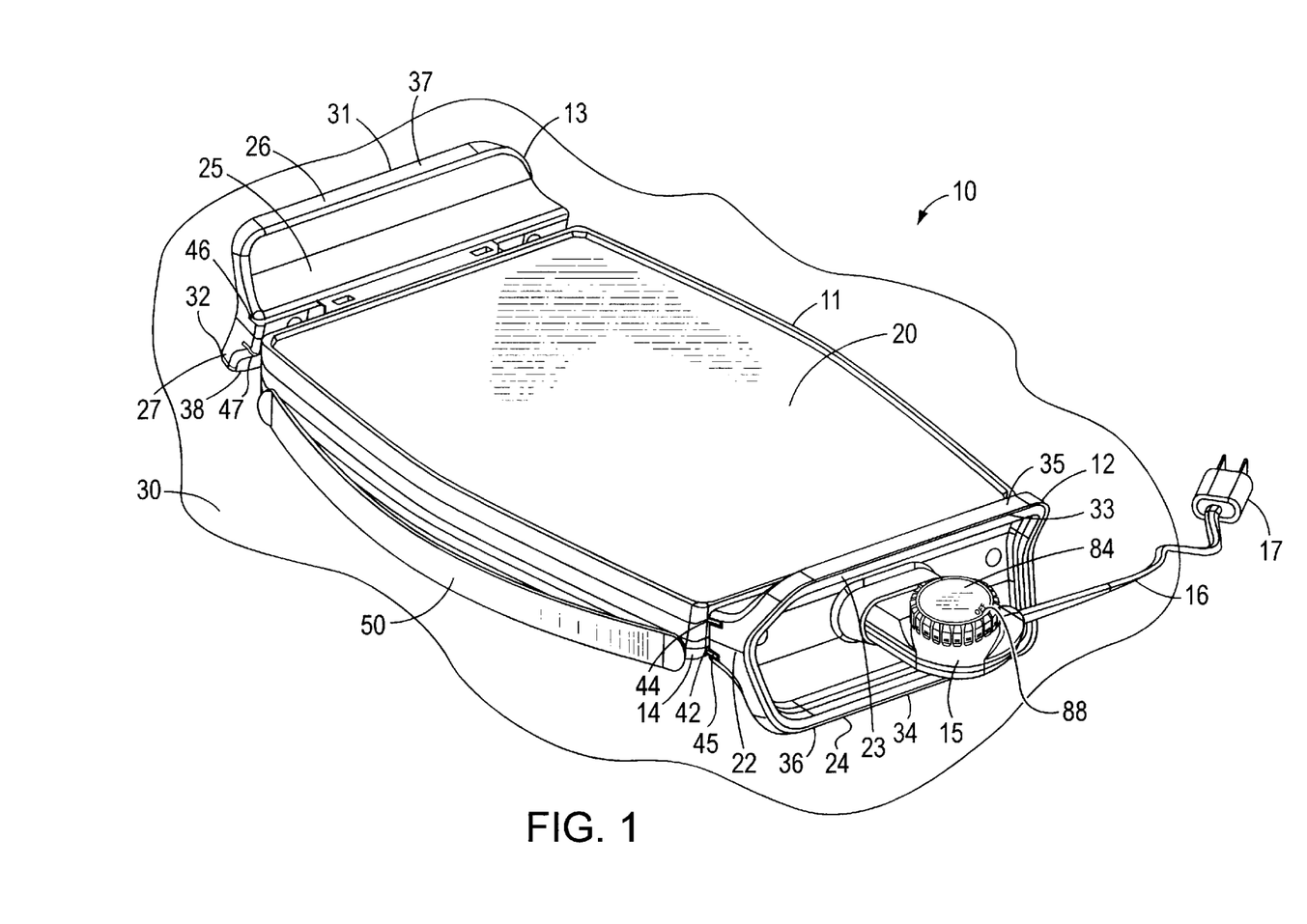
FIG. 1 is a perspective view of a cooking appliance constructed in accordance with this invention oriented for providing a smooth cooking surface.
Figure 2:
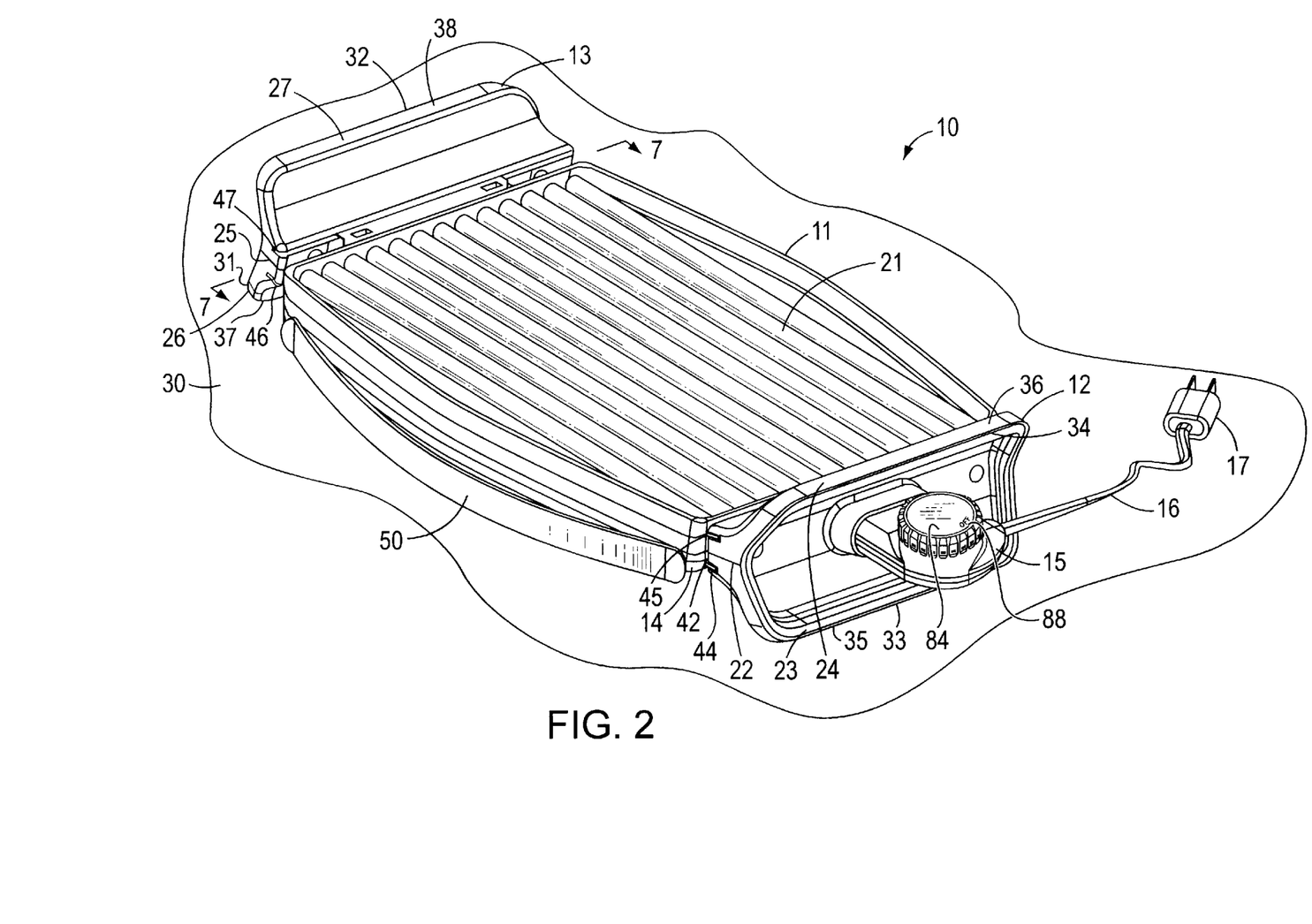
FIG. 2 is a perspective view of the cooking appliance in FIG. 1 reversed to provide a ribbed grilling surface.
Figure 3:
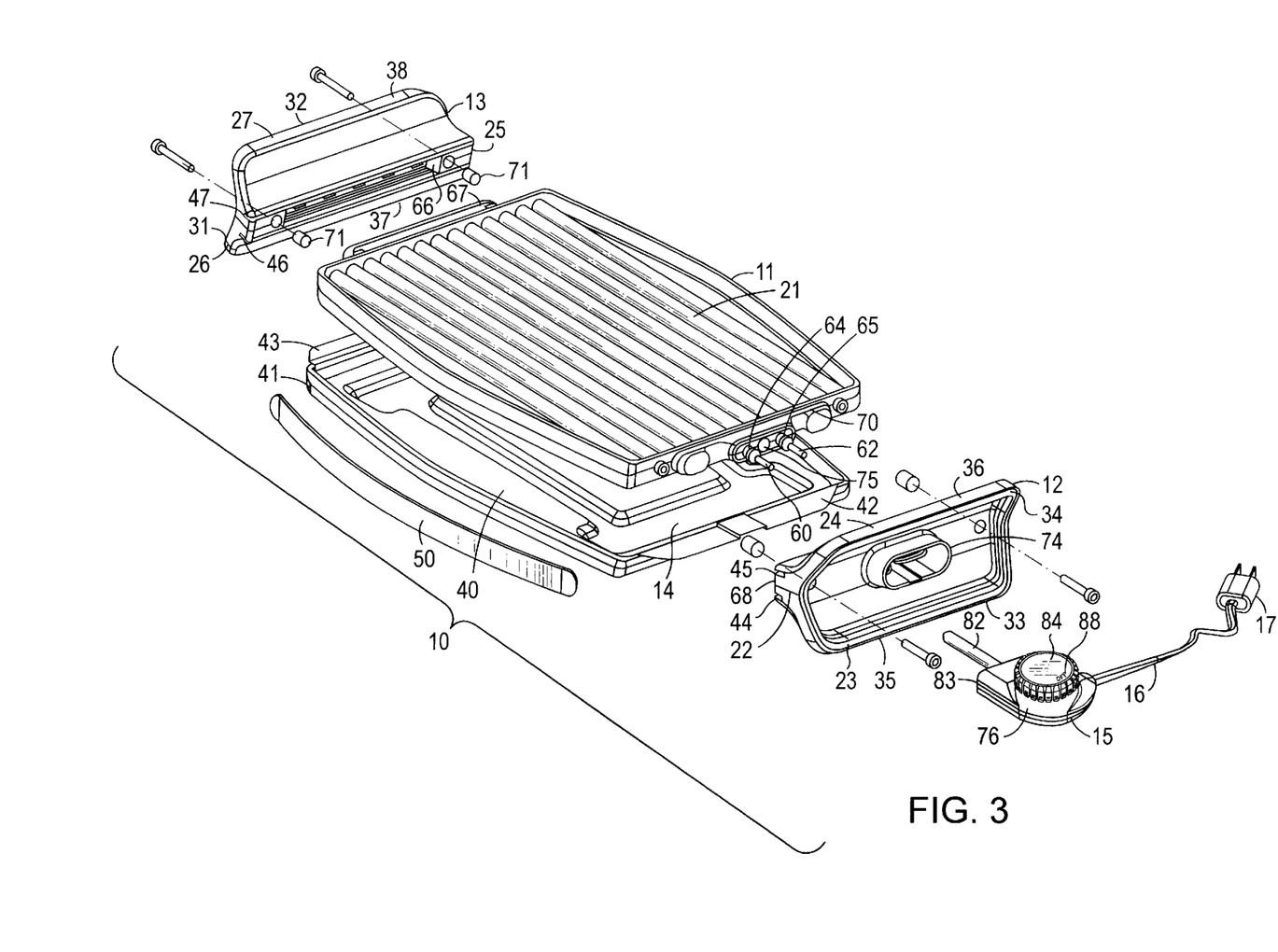
FIG. 3 is a perspective exploded view that depicts the components of the cooking appliance shown in the orientation of FIG. 2.

FIGS. 1 through 3 depict one embodiment of this invention in which a reversible self-contained electric cooking appliance 10 comprises a heating plate 11 suspended between a first end stand 12 and a second end stand 13. A reflector pan 14 is suspended from the first and second end stands 12 and 13. A detachable thermostatic control 15 includes a power cord 16 and end cap 17 for connection to a conventional home power service.

The heating element 11 in this particular embodiment is formed with a smooth cooking surface 20 shown in FIG. 1 and a ribbed cooking surface 21 shown in FIGS. 2 and 3. Thus in the orientation of FIG. 1 the cooking appliance 10 is positioned for griddling; in the position shown in FIG. 2, for grilling.

The end stand 12 has a center portion 22 and two diverging legs 23 and 24 that extend outwardly and divergently from the center section 22. Likewise the second end stand 13 includes a center section 25 with diverging legs 26 and 27. The central sections 22 and 25 engage extensions on the heating element 11 to suspend the heating element 11 therebetween. Each of the end stands 12 and 13 typically will be molded from an insulating plastic that is strong and that will withstand a dishwasher environment. A variety of moldable plastics are available. Such a material assures that the end stands 12 and 13 can be gripped during use without risk of burning an individual's hands.

With this configuration and as shown in FIG. 1, the legs 24 and 27 lie on a horizontal support surface 30 to position the smooth surface 20 for cooking. Conversely when the cooking device 10 is positioned with the legs 23 and 26 on the horizontal support surface 30 a grilling surface 21 is presented for use. Thus, the end stands 12 and 13 suspend the reflector pan 14 intermediate the heating plate 11 and the horizontal support 30 in either orientation.

Now looking at FIGS. 1 through 3, the legs 26 and 27 terminate in spaced, parallel outer edges 31 and 32 respectively. These two spaced parallel edges 31 and 32 define a plane transverse to a median plane through the heating element 11 parallel to the horizontal support 30 in the orientation shown in FIGS. 1 through 3. Now referring to FIG. 4, the edges 31 and 32 provide a stable support platform or foot that enables the cooking appliance 10 to be stored in a vertical orientation on a shelf or other horizontal support. The divergence of the legs 26 and 27 from the median plane assures that the center of gravity of the cooking appliance lies intermediate the edges 31 and 32 so the cooking appliance 10 is stable in this vertical storage position. As will now be apparent, this vertical storage capability greatly reduces the storage requirements of the cooking appliance 10 by minimizing shelf area. In one specific embodiment, the horizontal shelf space occupied by the cooking appliance 10 is less than 20% of the shelf space that would be occupied with the cooking appliance 10 in a horizontal orientation such as shown in FIG. 1.

As will also now be apparent the cooking appliance 10 has a reversible feature due to the construction of the ends stands 12 and 13 and the suspension of the heating element 11 between the end stands 12 and 13. Like the end stand 13, the end stand 12 includes the legs 23 and 24 that terminate at edges 33 and 34 of edge surfaces 35 and 36, respectively. The surfaces 35 and 36 are parallel to the midplane. The end stand 13 includes a similar set of parallel surfaces with parallel surface 37 adjacent the edge 31 and parallel surface 38 adjacent the edge 32. The edges 35, 36, 37 and 38 constitute feet for supporting the cooking appliance 10 in one of the two cooking orientations. As shown in FIG. 1, the feet 36 and 38 support the cooking appliance 10; in FIG. 2, the feet 35 and 37 provide the support.

Thus, in accordance with this invention the cooking appliance 10 shown in FIGS. 1 and 2 includes a heating plate 11 with first and second cooking surfaces 20 and 21 on opposite sides. The first and second end stands 12 and 13 connect to opposite ends of the heating plate and suspend the heating plate 11 parallel to and spaced from a supporting surface, such as a supporting surface 30. The pan 14 mounts intermediate the heating plate and the support surface.

More specifically the reflector pan 14, as shown in FIG. 3 includes metal bottom 40 that may be flat or stamped in various forms for stiffening and a peripheral side wall 41. Tongues 42 and 43 extend from the peripheral side wall 41 at opposite ends of the reflector pan 14. These tongues slide into oppositely located grooves formed in the end stands 12 and 13. More specifically, the end stand 12 includes two parallel spaced grooves 44 and 45 located on opposite sides of the midplane in the central section 22. Similar slots 46 and 47 are formed in the center section 25 of the end stand 15. An optional handle 50 can be attached to the front edge of the pan 14 particularly to the corners of the peripheral wall 41 to facilitate the removal of the pan from the cooking appliance 10.

In the orientation of FIG. 1 the slots 45 and 47 support the reflector tongues 42 and 43. In the orientation shown in FIG. 2 the slots 44 and 46 receive the tongues 42 and 43.

Figure 4:
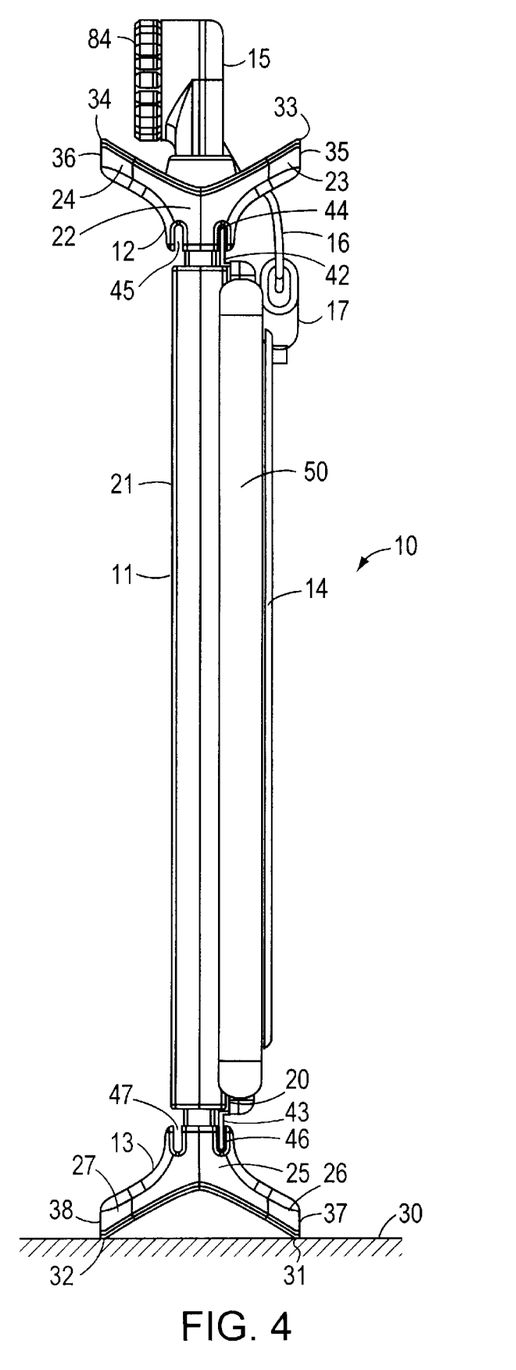
FIG. 4 is a plan view of the cooking appliance in a vertically stored position.

The pan 14 performs two functions. First, if the pan 14 is formed of a reflective material, it will impede any radiant heat transfer to the support 30. That is, it will tend to reflect any radiant heat back to the heating element 11. This enables the heating element 11 to be located closer to the support surface 30 while minimizing any risk of damaging the support surface 30, such as a laminated countertop. Further closer spacing reduces the overall height of the cooking appliance 10 in the orientation shown in FIGS. 1 and 2 and further minimizes the storage requirements when the cooking appliance 10 is stored as shown in FIG. 4 because it will require even less shelf space.

Figure 5:
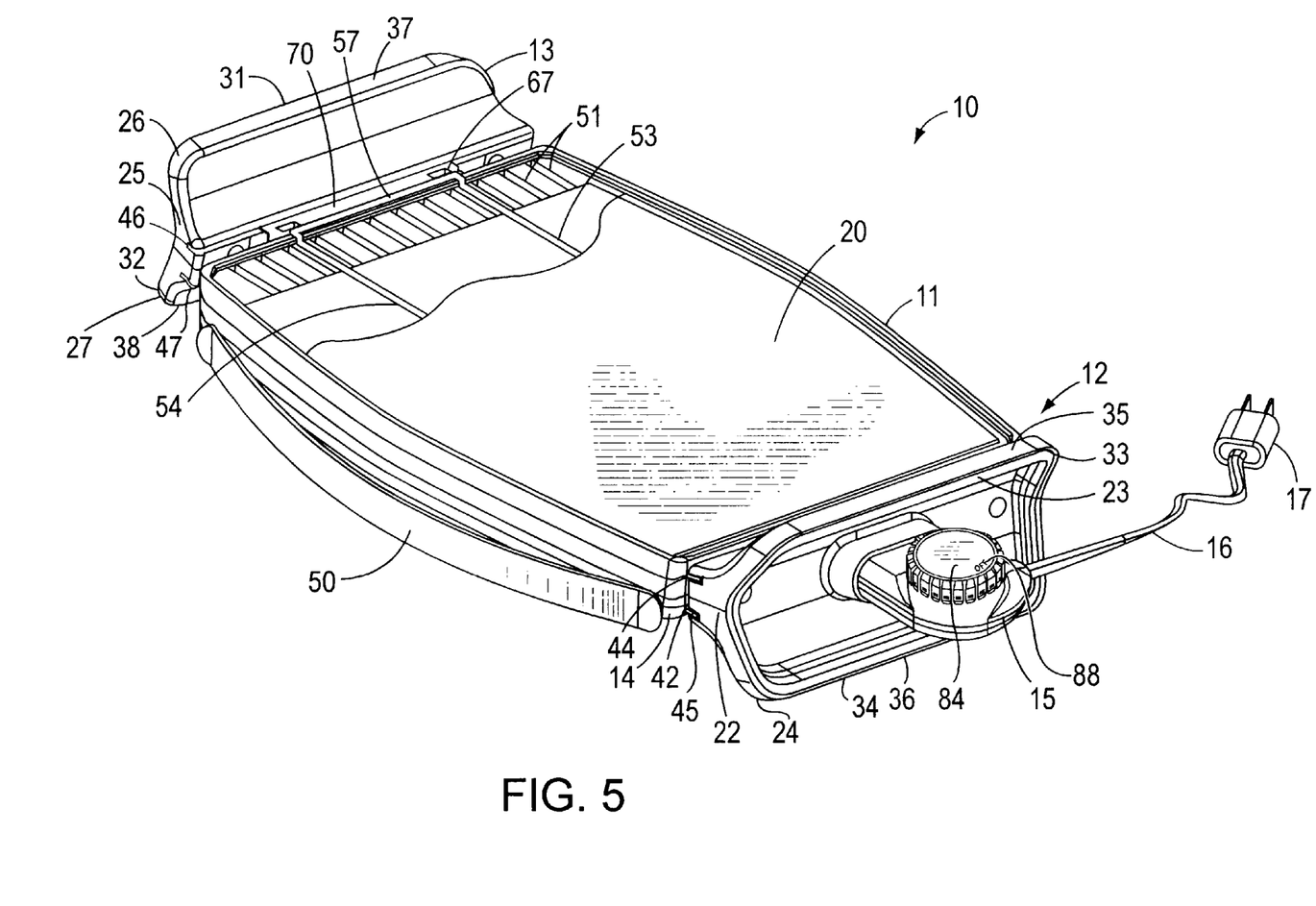
FIG. 5 is a perspective view partially cut away to depict certain aspects of this invention.
Figure 7:
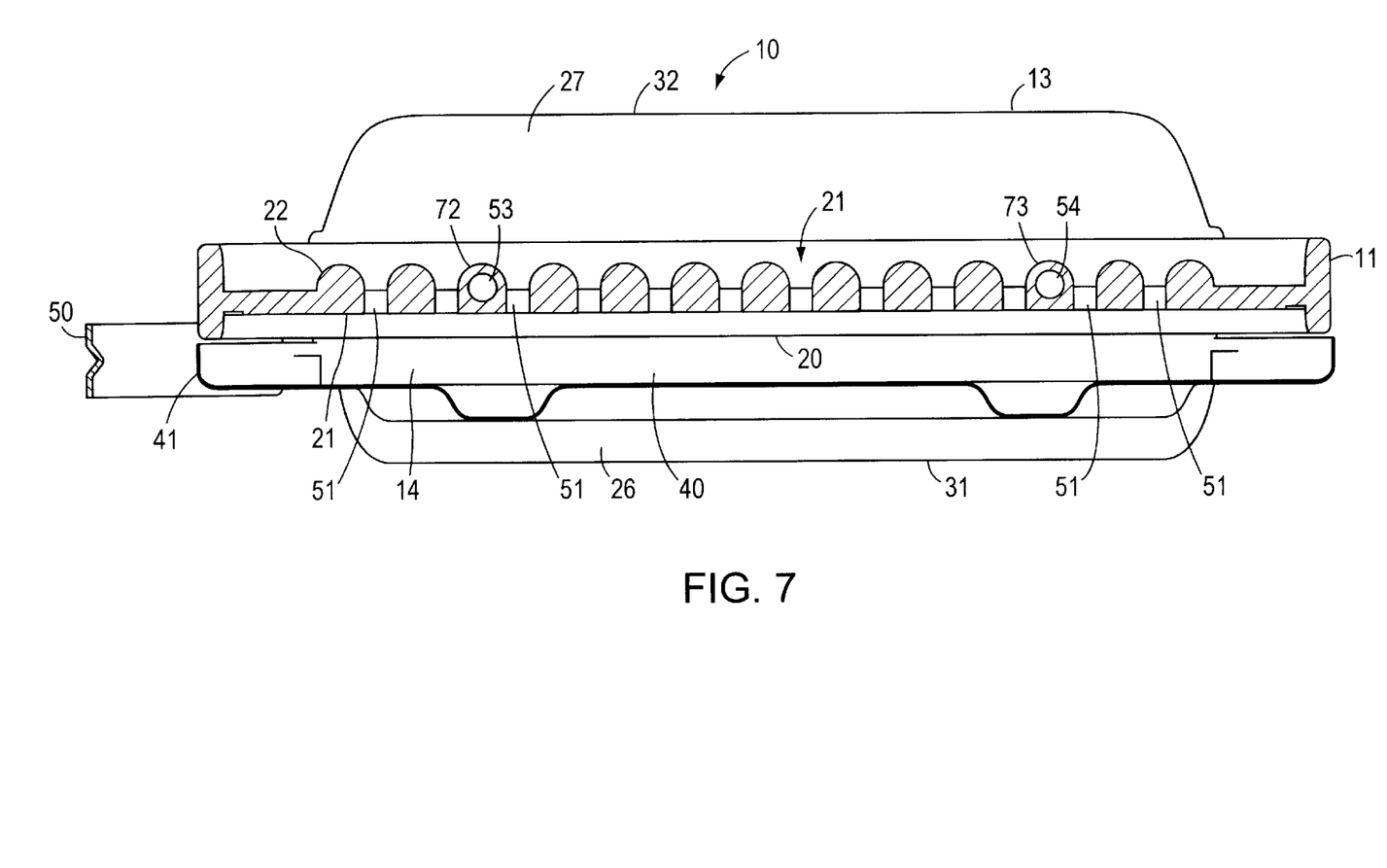
FIG. 7 is a cross-section view through line 7—7 of FIG. 2.

Still referring to FIG. 3, the bottom portion 40 and a peripheral wall 41 constitute a receptacle for accumulating grease or other materials that drain from a cooking surface during use. FIGS. 5 and 7 particularly depict a drain formed by a plurality of slots 51 through the heating element 11. These drain slots 51 are preferably located at one end of the heating element 11 adjacent one of the end stands 12 or 13 and formed during casting of the heating element 11. In this particular embodiment the drain slots 51 are located at the end proximate the end stand 13 to locate the drain remotely from the end stand 12 which includes the thermostatic control 15 and power connections. Each of the slots 51 passes through the heating element between adjacent ribbed surfaces. With this structure grease can be moved toward the second end stand 13 to drain through the various drain slots 51 and be accumulated in the reflector pan 14.

To facilitate draining, the end stands 12 and 13 can also be constructed with a vertical span between the edges 33 and 34 of the end stand 12 that is slightly greater than the corresponding vertical span between the edges 31 and 32. When the cooking appliance 10 rests on a horizontal support surface 30 the differential will elevate the end of the heating element proximate the end stand 12 thereby providing natural drainage of grease or other materials by gravity toward the drain slots 51 by tilting the cooking surface slightly.

Figure 6:
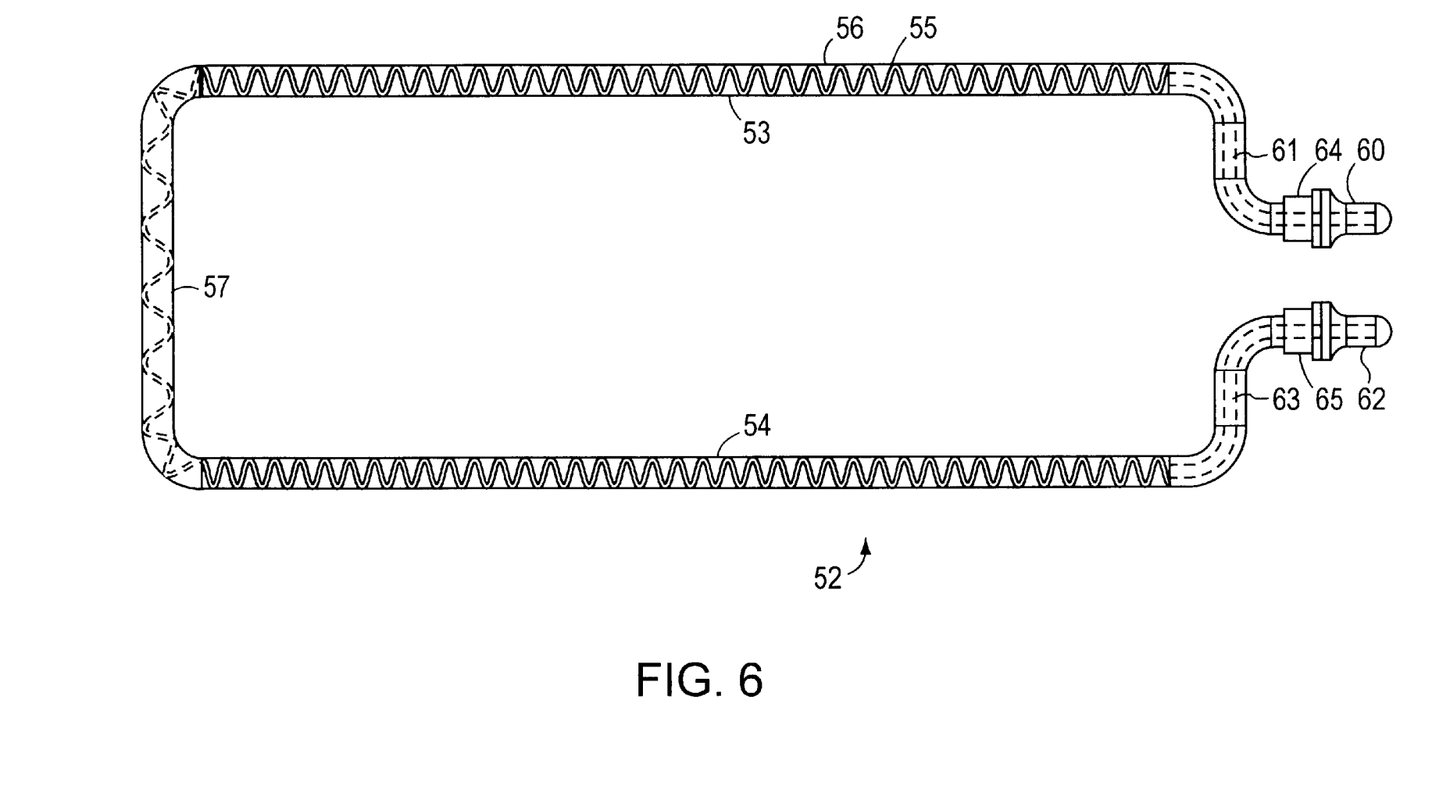
FIG. 6 is detailed plan view that depicts the heating element used in the cooking appliance of FIGS. 1 through 5.

As another aspect of this invention, the heating element 11 is formed of aluminum or other heat conducting material that is cast about an electrical heating element 52 shown particularly in FIGS. 5 and 6. As shown particularly in FIG. 6, the heating element 52 includes two spaced, parallel legs 53 and 54. Each of the legs includes a wound heating ribbon or wire 55 encased in an outer sheath 56. An intermediate section or leg 57 extends between corresponding ends of the legs 53 and 54. It also includes a portion of the wound ribbon or wire 55 thereby to provide electrical continuity between the legs 53 and 54. At the other end, an electrical connector 60 attaches to a conductor 61 that in turn connects to one end of the wound wire 55. A connector 62 similarly connects to a conductor 63 from the other end of the wound wire 55.

In manufacture the entire structure is initially formed as linear structure with a maximum pitch across the length of the heating element corresponding to the intermediate leg 57. In this disclosure "pitch" is a measure of distance between adjacent turns. In the portions corresponding to the legs 53 and 54, the pitch is selected to produce an appropriate heat output per unit length that is, the pitch in the legs 53 and 54 is less than the pitch in the intermediate leg 57. As a result the output per unit length across the intermediate leg 57 is significantly less than the corresponding output for unit length from the parallel legs 53 and 54. After forming this structure, it can be bent into the form shown in FIG. 6. Such manufacturing processes are well known in the art.

Now referring to FIGS. 3 and 5, during the molding process the embedded heating element 52 is positioned so the connectors 60 and 62 emerge at the edge of the heating plate 11 proximate the first end stand 12. Bushings 64 and 65 associated with the connectors 60 and 62 assure a positive seal against any water or other materials entering the casting.

As shown most clearly in FIG. 3, the end stand 13 has a socket 66 to receive a portion of an extension 67 of the heating plate 11. Similarly a socket 68 on the end stand 12 is adapted to be engaged and surround an extension 70 through which connectors 60 and 62 extend. The extension 67 as particularly shown in FIGS. 3 and 5, has embedded therein the intermediate leg 57 of the heater element 52. To minimize heat transfer to the end stand 13, that can also be used as a handle, spacers 71 provide a standoff distance such that the socket 66 overlies only a portion of the extension 67. Thus air is free to move through the resulting air gap and maintain a minimal heat transfer to the end stand 13.

FIG. 7 depicts a cross-section through the heating plate 11 with its smooth surface 20 on the bottom and ribbed surface 21 on the top. FIG. 7 also depicts the location of the drain slots 51 between adjacent ones of the ribs. In accordance with a preferred embodiment of this invention, the heating element leg 53 is embedded in a portion of the heating plate 11 that forms a rib 72 of the cooking surface 21; and the heating element leg 54, in a rib 73. Locating the heating element legs 53 and 54 in interior portions of the heating element within the perimeter defined by the cooking surfaces 20 and 21 provides more even heating than would otherwise would be available by providing a heating element about the periphery of the heating plate 11. Placing the intermediate leg 57 with its reduced heat output outside the cooking surfaces further minimizes heating unevenness that would be found if the intermediate leg 57 were located within the perimeter of the cooking surfaces 20 and 21.

Thus the heating plate 11 by virtue of being cast about the heating element 52 as described provides substantially uniform heating over the cooking surface 20 or 21. Moreover, the combination of casting and sealing the heating plate 11 and the selection of appropriate materials for the end stands 12 and 13 provides a structure that is dishwasher safe. Consequently, in accordance with another aspect of this invention, it is possible to place the cooking appliance 10 in a dishwasher after the thermostatic control 15 is removed.

Figure 8:
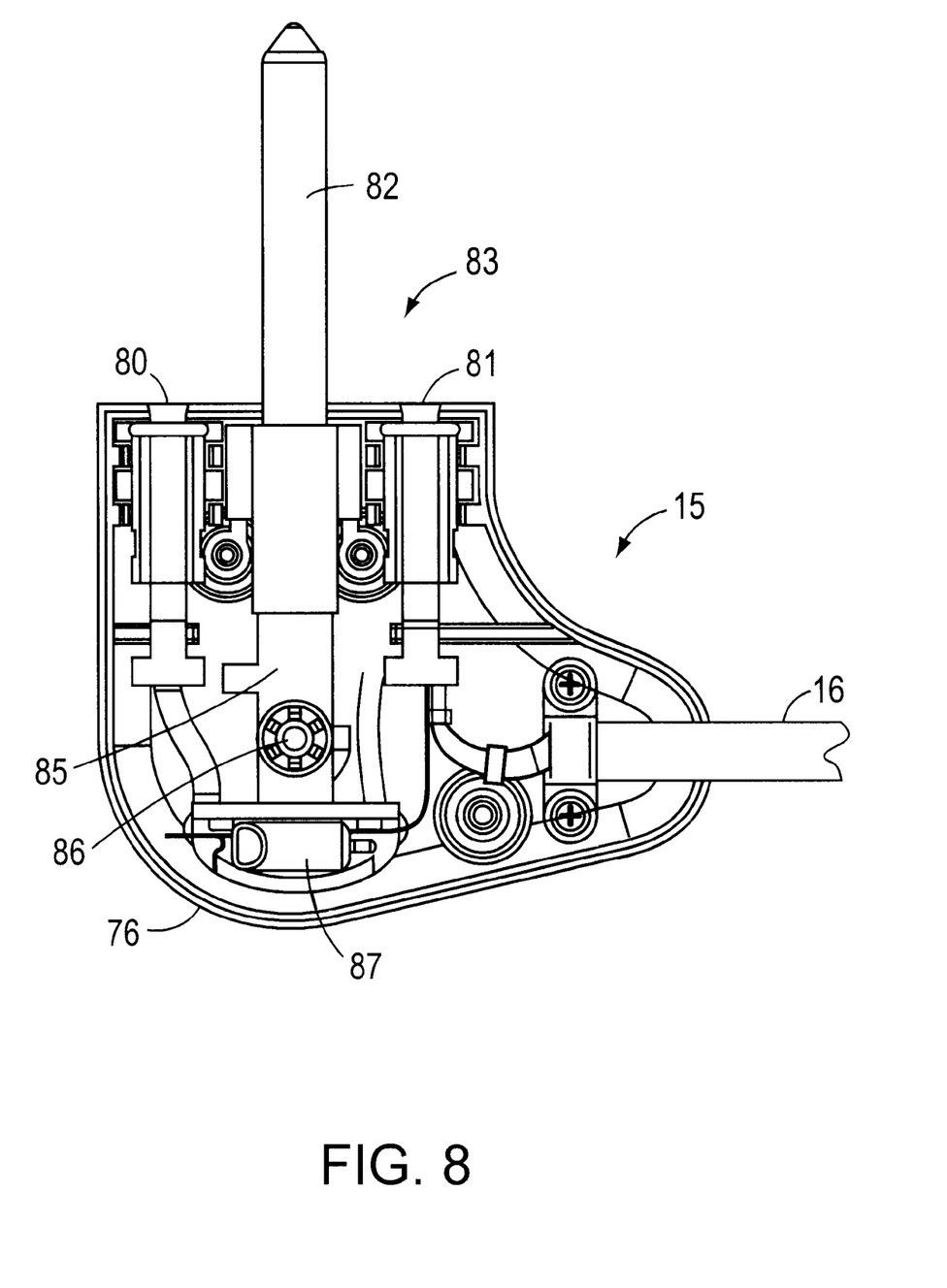
FIG. 8 is a view of a thermostatic control used in connection with the cooking appliance of FIGS. 1 through 5.

FIGS. 3 and 8 depict the detachable thermostatic control 15. FIG. 3 also depicts a supporting structure of the end stand 12 that includes a central socket 74 surrounding the male connectors 60 and 62. The heating element 11 also includes a well 75 formed in the casting in a position corresponding to a central rib. The thermostatic control 15 comprises a body 76 that carries female power sockets 80 and 81 that align with the male connectors 60 and 62. A centrally located temperature probe 82 fits in the well 75. All these project from the end 83 of the thermostatic control 15. In viewing the thermostatic control 15 from the end 83, the structure is symmetrical so the thermostatic control can always be placed in the heating element 11 in either cooking orientation with the control knob 84 in an upper, readily visible position.

The knob 84 controls the operation of a conventional thermostatic control on/off switch 85 through a rotary shaft 86. Such on/off thermostatic control switches are well known in the art. In addition the housing 81 carries a lamp 87 proximate a reference or index position 88 on the housing. This lamp 87 back lights a portion or sector at the index position 88 so that the back lighting illuminates that portion of any translucent lettering 89 that is at the index position 88.

When the structures of FIG. 3 are assembled into the cooking appliance 10 of FIGS. 1 and 2, the cooking appliance 10 is characterized by having first and second cooking surfaces on opposite sides of a cast metal heating plate with an embedded heating element that is suspended between first and second end stands of an insulating material. The ends stands are symmetrical to allow the heating plate to be supported substantially parallel to a support surface in either a first or second orientation that makes one of the first or second cooking surfaces available for use. Diverging legs on one end stand enable the cooking appliance to be placed in a horizontal position for cooking and in a vertical orientation for storage. A reflector mounts between the end structures 12 and 13 thereby to reflect heat from the heating plate 12 and minimize the transfer of heat to the supporting surface. This reflector additionally may be formed to accumulate grease or other cooking materials if a drain, such as the drain formed by the slots 51, is formed through the heating element 11. Properly selecting materials for the end stands, sealing all the electrical connectors and using a detachable thermostatic control allows the cooking appliance to be cleaned in a dishwasher without fear of destroying any of the electrical components.

This specific embodiment depicts particular structures, such as the cooking surface 21, with particular characteristics, such as a parallel, spaced rib surface. Other cooking surfaces could be substituted for one or both of the specifically disclosed cooking surfaces, although certain configurations, such as a waffle surface, might prevent inhibit or prevent grease from draining from such a cooking surface. One specific electric heating element has been disclosed with a specific arrangement of components. Other heating elements could be substituted. Differently shaped end structures could be substituted for the specifically disclosed end stands 12 and 13. Any of these or other modifications could be made while attaining some or all of the advantages of this invention. Thus it is the intent of the appended claims to cover all such variations and modifications as come within the true spirit and scope of this invention.

What is claimed as new and desired to be secured by Letters Patent of the United States is:

1. A reversible self-contained cooking appliance comprising:
   A) a heating plate with first and second cooking surfaces on opposite sides thereof and with an integral heater therein,
   B) first and second end stands suspending said heating plate therebetween substantially parallel to and spaced from a supporting surface with one of said first and second cooking surfaces being an upper, working surface, and
   C) a removable reflector for being mounted intermediate said heating plate and support surface in either of said cooking surfaces constituting the upper working surface, said reflector having an extent that corresponds to the extent of each of said first and second cooking surfaces.

2. A reversible cooking appliance as recited in claim 1 wherein said cooking appliance additionally comprises first and second reflector support structures that carry said reflector when said first and second cooking surfaces are being used, respectively.

3. A reversible cooking appliance as recited in claim 2 wherein said reflector has tongues extending from each end thereof and said first and second reflector support structures include first and second grooves in each of said first and second stands displaced from and parallel said second and first cooking surfaces, respectively.

4. A reversible cooking appliance as recited in claim 1 wherein first cooking surface is flat and said second cooking surface is ribbed and at least a portion of said electric heating element is embedded in said heating plate.

5. A reversible cooking appliance as recited in claim 1 wherein each of said first and second stands includes a central portion for engaging said heating plate and first and second legs that extending oppositely from said central portion, said first and second legs supporting said cooking appliance when said first and second cooking surfaces are used, respectively.

6. A reversible cooking appliance as recited in claim 5 wherein said heating plate includes an electrical heating element with electrical connections extending from a first end of said heating plate, said first stand additionally including electrical connections for coupling said heating element to a power supply.

7. A reversible cooking appliance as recited in claim 6 wherein heating element connections are accessible from one end of said heating plate and said heating plate and said heating plate additionally includes a well portion, said electrical connections on said first stand including first and second power connections for engaging corresponding power connections from said heating plate and a temperature probe that extends into said well.

8. A reversible cooking appliance as recited in claim 7 wherein said electrical connections on said first stand include a detachable thermostatic control that controls the energization of said heating element in response to the temperature sensed by the probe and an input temperature set into said thermostatic control.

9. A reversible self-contained cooking appliance as recited in claim 5 wherein first and second spaced stands engage said first and second end portions of said heating plate, respectively thereby to position said cooking appliance with said cooking element substantially parallel to the support surface in a first orientation, at least one of said first and second spaced stands including:
   i) a central portion for engaging said corresponding end portion of said cooking element, and
   ii) a peripheral portion having terminating in a plane transverse to the axis and to the plane of said cooking element thereby to define a foot for supporting said cooking appliance with the cooking element axis normal to a support surface in a second orientation.

10. A reversible self-contained cooking appliance as recited in claim 5 wherein said first cooking surface is flat and said second cooking surface is formed with a plurality of parallel, spaced rib portions, and said heating element additionally includes a drain comprising at least one opening through said heating element intermediate at least one of said ribs and proximate one of said first and second end stands, said reflector being formed with a depth for receiving material from said drain.

11. A reversible self-contained cooking appliance as recited in claim 10 wherein said drain is located proximate said second end stand and said first end stand elevates the heating element to a greater distance above the support surface than the second end stand thereby to tilt the cooking surfaces forward said send end stand.

12. A reversible self-contained cooking appliance as recited in claim 10 wherein said electric heating element includes:
   i) first and second heating element parallel legs that extend through and embed in said heating plate,
   ii) an interconnecting element between first ends of said first and second legs and embedded said heating plate, and
   iii) electrical connectors coupling said second ends of said first and second legs to a power supply.

13. A reversible self-contained cooking appliance as recited in claim 12 wherein said electrical connectors attach to a thermostatic control including a control knob with translucent portions for identifying predetermined operating conditions for said thermostatic control and a light energized by said connections for backlighting a selected translucent portion.

14. A reversible self-contained cooking appliance as recited in claim 10 additionally comprising a thermostatic control for said heating plate including a control knob with translucent portions for identifying predetermined operating conditions for said thermostatic control and a light energized by said connections for backlighting a selected translucent portion.

15. A reversible self-contained cooking appliance as recited in claim 5 wherein said electric heating element includes:
   i) first and second heating element parallel legs that extend through said heating plate and embedded therein,
   ii) a interconnecting element between first ends of said first and second legs and embedded said heating plate, and
   iii) electrical connectors coupling said second ends of said first and second legs to a power supply.

16. A reversible self-contained cooking appliance as recited in claim 15 wherein said heating plate has a plurality of rib portions forming said second cooking surface, each of said heating element legs being embedded on one of said rib portions, and wherein said heating element comprises a wound heater having a first pitch over the length of said first and second legs and a second pitch over the length of said interconnecting element.

17. A reversible self-contained cooking appliance as recited in claim 16 wherein said interconnecting element is embedded in a portion of said heating plate extending beyond said cooking surfaces and said second end stand includes a support that carries said extended portion with an air gap thereabout.

18. A reversible self-contained cooking appliance as recited in claim 17 additionally comprising seals at the positions at which each of said electrical connectors emerges from said heating element.

19. A reversible self-contained cooking appliance as recited in claim 15 wherein said electrical connections attach to a thermostatic control including a control knob with translucent portions for identifying predetermined operating conditions for said thermostatic control and a light energized by said connections for backlighting said translucent portions.

20. A reversible self-contained cooking appliance as recited in claim 1 additionally comprising a thermostatic control for controlling said heating plate, said thermostatic control including a control knob with translucent portions for identifying predetermined operating conditions for said thermostatic control and a light energized by said connections for backlighting a selected translucent portion.

21. A reversible self-contained cooking appliance as recited in claim 1 wherein said heating element includes a drain therethrough proximate one of said first and second end stands, said reflector being formed with a depth for receiving material from said drain.

22. A reversible self-contained cooking appliance as recited in claim 21 wherein said first cooking surface is flat and said second cooking surface is formed with a plurality of parallel, spaced rib portions, said drain comprising at least one opening through said heating element intermediate a pair of adjacent spaced ribs.

23. A reversible self-contained cooking appliance as recited in claim 22 wherein said end stands support the first and second end portions of said heating element from the support surface by different distances thereby to tilt the cooking surfaces.

24. A reversible self-contained cooking appliance as recited in claim 23 wherein said drain is located proximate said second end stand and said first end stand elevates the heating element to a greater distance above the support surface than the second end stand.

25. A reversible self-contained cooking appliance as recited in claim 21 wherein said electric heating element includes:
   i) first and second heating element parallel legs that extend through and embed in said heating plate,
   ii) an interconnecting element between first ends of said first and second legs and embedded said heating plate, and
   iii) electrical connectors coupling said second ends of said first and second legs to a power supply.

26. A reversible self-contained cooking appliance as recited in claim 25 wherein said electrical connectors attach to a thermostatic control includes a control knob with translucent portions for identifying predetermined operating conditions for said thermostatic control and a light energized by said connections for backlighting a selected translucent portion.

27. A reversible self-contained cooking appliance as recited in claim 21 additionally comprising a thermostatic control for controlling said heater plate, said thermostatic control including a control knob with translucent portions for identifying predetermined operating conditions for said thermostatic control and a light energized by said connections for backlighting a selected translucent portion.

28. A reversible self-contained cooking appliance as recited in claim 1 wherein said electric heating element includes:
   i) first and second heating element parallel legs that extend through and embed in said heating plate,
   ii) an interconnecting element between first ends of said first and second legs and embedded said heating plate, and
   iii) electrical connectors coupling said second ends of said first and second legs to a power supply.

29. A reversible self-contained cooking appliance as recited in claim 28 wherein said heating plate has a plurality of rib portions forming said second cooking surface, each of said heating element legs being embedded on one of said rib portions, and wherein said heating element comprises a wound heater having a first pitch over the length first and second legs and a second pitch over the length of said interconnecting element.

30. A reversible self-contained cooking appliance as recited in claim 29 wherein said interconnecting element is embedded in a portion of said heating plate extending beyond said cooking surfaces and said second end stand includes a support that carries said extended portion of said heating element therein with an air gap thereabout.

31. A reversible self-contained cooking appliance as recited in claim 30 additionally comprising seals at the positions at which each of said electrical connectors emerges from said heating element at said second end thereof.

32. A reversible self-contained cooking appliance as recited in claim 31 wherein said electrical connectors attach to a thermostatic control including a control knob with translucent portions for identifying predetermined operating conditions for said thermostatic control and a light energized by said connections for backlighting a selected translucent portion.

33. A reversible self-contained cooking appliance as recited in claim 28 wherein said electrical connectors attach to a thermostatic control including a control knob with translucent portions for identifying predetermined operating conditions for said thermostatic control and a light energized by said connections for backlighting a selected translucent portion.

34. An electric self-contained cooking appliance comprising:
A) a heating plate with at least one cooking surface and with an integral electric heater element therein,
B) a reflector for being mounted intermediate said heating plate and support surface, said reflector having an extent that corresponds to the extent of said cooking surface, and
C) first and second end stands connected to opposite ends of said heating plate for suspending said heating plate therebetween parallel to and spaced from a supporting surface, said first and second end stands including means for supporting said reflector intermediate said heating plate and the supporting surface.

35. An electric self-contained cooking appliance as recited in claim 34 wherein one said first and second end stands includes means for supporting said cooking appliance on the support surface with said cooking surface normal to the support surface.

36. An electric self-contained cooking appliance as recited in claim 34 wherein each of said first and second stands includes a central portion for engaging said heating plate and first and second legs extending oppositely from said central portion, said first legs on said first and second end stands supporting said cooking appliance when said first and second cooking surfaces are used and said first and second legs on one of said first and second end stands supporting said cooking appliance for storage.

37. An electric self-contained cooking appliance as recited in claim 36 wherein said heating plate includes an electrical heating element with electrical connections extending from a first end of said heating plate, said first stand additionally including electrical connections for coupling said heating element to a power supply.

38. An electric self-contained cooking appliance as recited in claim 37 wherein heating element connections are accessible from one end of said heating plate and said heating plate additionally includes a well portion, said electrical connections on said first stand including first and second power connections for engaging corresponding power connections from said heating plate and a temperature probe that extends into said well.

39. An electric self-contained cooking appliance as recited in claim 38 wherein said electrical connections on said first stand attach to a detachable thermostatic control that controls the energization of said heating element in response to the temperature sensed by the probe and an input temperature set into said thermostatic control.

40. An electric self-contained cooking appliance as recited in claim 34 wherein first and second spaced stands engage said first and second end portions of said heating plate, respectively, thereby to position said cooking appliance with said cooking element substantially parallel to the support surface in a first orientation, at least one of said first and second spaced stands including:
i) a central portion for engaging said corresponding end portion of said cooking element, and
ii) a peripheral portion having terminating in a plane transverse to the axis and to the plane of said cooking surface.

41. An electric self-contained cooking appliance as recited in claim 40 wherein said heating element includes a drain therethrough proximate one of said first and second end stands, said reflector being formed with a depth for receiving material from said drain.

42. An electric self-contained cooking appliance as recited in claim 41 wherein said heating element has a flat cooking surface and a ribbed cooking surface, said drain comprising at least one opening through said heating element intermediate at least one of said spaced ribs.

43. An electric self-contained cooking appliance as recited in claim 41 wherein said end stands support the first and second end portions of said heating element from the support surface by different distances thereby to tilt the cooking surface.

44. An electric self-contained cooking appliance as recited in claim 43 wherein said drain is located proximate said second end stand and said first end stand elevates the heating element to a greater distance above the support surface than the second end stand.

45. An electric self-contained cooking appliance as recited in claim 41 wherein said electric heating element includes:
i) first and second heating element parallel legs that extend through and embed in said heating plate,
ii) an interconnecting element between first ends of said first and second legs and embedded said heating plate, and
iii) electrical connectors coupling said second ends of said first and second legs to a power supply.

46. An electric self-contained cooking appliance as recited in claim 45 additionally comprising a thermostatic control including a control knob, an index formed on said control, said control knob including translucent portions for identifying predetermined operating conditions for said thermostatic control and a light for backlighting said translucent portions proximate said index.

47. An electric self-contained cooking appliance as recited in claim 40 additionally comprising a thermostatic control including a control knob, an index formed on said control, said control knob including translucent portions for identifying predetermined operating conditions for said thermostatic control and a light for backlighting said translucent portions proximate said index.

48. An electric self-contained cooking appliance as recited in claim 34 wherein said electric heating element includes:

i) first and second heating element parallel legs that extend through and embed in said heating plate, ii) an interconnecting element between first ends of said first and second legs and embedded said heating plate, and iii) electrical connectors coupling said second ends of said first and second legs to a power supply.

49. An electric self-contained cooking appliance as recited in claim 40 additionally comprising a thermostatic control including a control knob, an index formed on said control, said control knob including translucent portions for identifying predetermined operating conditions for said thermostatic control and a light for backlighting said translucent portions proximate said index.

50. An electric self-contained cooking appliance as recited in claim 34 additionally comprising a thermostatic control including a control knob, an index formed on said control, said control knob including translucent portions for identifying predetermined operating conditions for said thermostatic control and a light for backlighting said translucent portions proximate said index.

51. A reversible self-contained cooking appliance comprising:

A) a heating plate with first and second cooking surfaces on opposite sides thereof and with an integral heater therein, B) first and second end stands connected to opposite ends of said heating plate for suspending said heating plate therebetween parallel to and spaced from a supporting surface with one of said first and second cooking surfaces being an upper, working surface, said heating plate having at least one drain therethrough, and C) a receptacle being mounted intermediate said heating plate and support surface, said receptacle having an extent that corresponds to the extent of each of said first and second cooking surfaces and a portion that aligns with said at least one drain to accumulate material passing through said drain.

52. A reversible self-contained cooking appliance as recited in claim 51 wherein said receptacle is made of a heat reflective material.

53. A reversible self-contained cooking appliance as recited in claim 52 wherein said drain is located proximate one of said first and second end stands.

54. A reversible self-contained cooking appliance as recited in claim 53 wherein said first cooking surface is flat and said second cooking surface is formed with a plurality of parallel, spaced rib portions, said drain comprising openings through said heating element intermediate at least one of said spaced ribs.

55. A reversible self-contained cooking appliance as recited in claim 54 wherein said end stands support the first and second end portions of said heating element from the support surface by different distances thereby to tilt the cooking surfaces.

56. A reversible self-contained cooking appliance as recited in claim 52 wherein said drain is located proximate said second end stand and said first end stand elevates the heating element to a greater distance above the support surface than the second end stand.

57. A reversible self-contained cooking appliance as recited in claim 51 wherein said electric heating element includes:

i) first and second heating element parallel legs that extend through and embed in said heating plate, ii) an interconnecting element between first ends of said first and second legs and embedded said heating plate, and iii) electrical connectors coupling said second ends of said first and second legs to a power supply.

58. A reversible self-contained cooking appliance as recited in claim 51 additionally comprising a thermostatic control including a control knob, an index formed on said control, said control knob including translucent portions for identifying predetermined operating conditions for said thermostatic control and a light for backlighting said translucent portions proximate said index.

59. A reversible self-contained cooking appliance as recited in claim 52 additionally comprising a thermostatic control including a control knob, an index formed on said control, said control knob including translucent portions for identifying predetermined operating conditions for said thermostatic control and a light for backlighting said translucent portions proximate said index.

60. A reversible self-contained cooking appliance comprising:

A) a heating plate with first and second cooking surfaces on opposite sides thereof and with an integral electrical heater element, B) first and second end stands connected to opposite ends of said heating plate for suspending said heating plate therebetween substantially parallel to and spaced from a supporting surface with one of said first and second cooking surfaces being an upper, working surface, and C) a reflector carried by said first and second end stands intermediate said heating plate and support surface, said reflector having an extent that corresponds to the extent of each of said first and second cooking surfaces.

61. A reversible self-contained cooking appliance as recited in claim 60 wherein first cooking surface is flat and said second cooking surface is ribbed and at least a portion of said heater element is embedded in said heating plate.

62. A reversible self-contained cooking appliance as recited in claim 61 wherein said heater element includes:

i) first and second heating element parallel legs that extend through said heating plate, ii) a interconnecting element extending between first ends of said first and second legs and embedded in a portion of said heating plate extending beyond said cooking surfaces for being supported by said second stand, and iii) electrical connectors coupling said second ends of said first and second legs to a power supply.

63. A reversible self-contained cooking appliance as recited in claim 62 wherein said heating element comprises a wound heater having a first pitch over the length first and second legs and a second pitch over the length of said interconnecting element.

64. A reversible self-contained cooking appliance as recited in claim 62 wherein said heating plate as a plurality of rib portions forming said second cooking surface, each of said heating element legs being embedded on one of said rib portions.

65. A reversible self-contained cooking appliance as recited in claim 64 wherein additionally comprising seals at the positions at which each of said electrical connectors emerges from said heating element at said second end thereof.

66. A reversible self-contained cooking appliance as recited in claim 62 wherein each heater leg is formed as a wound heater with a first pitch and said interconnecting element is formed as a wound heater with an increased pitch.

67. A reversible self-contained cooking appliance as recited in claim 66 wherein said second end stand includes a support for carrying said extended portion of said heating element therein with an air gap thereabout.

68. A reversible self-contained cooking appliance as recited in claim 62 additionally comprising a thermostatic control including a control knob, an index formed on said control, said control knob including translucent portions for identifying predetermined operating conditions for said thermostatic control and a light for backlighting said translucent portions proximate said index.

* * * * *

UNITED STATES PATENT AND TRADEMARK OFFICE
CERTIFICATE OF CORRECTION

PATENT NO.    : 6,064,042
DATED         : May 16, 2000
INVENTOR(S)   : Dov Z. Glucksman et al.

It is certified that error appears in the above-identified patent and that said Letters Patent is hereby corrected as shown below:

<u>Column 7,</u>
Line 66, delete "in" and insert -- with --

Signed and Sealed this

Eighth Day of April, 2003

JAMES E. ROGAN
*Director of the United States Patent and Trademark Office*